No. 682,982. Patented Sept. 17, 1901.
E. EINFELDT.
METHOD OF MAKING WHEELS.
(Application filed July 11, 1901.)
(No Model.)

Witnesses
F. S. Elmore
N. R. Kenney

Inventor
Emil Einfeldt
P. T. Dodge, Attorney

UNITED STATES PATENT OFFICE.

EMIL EINFELDT, OF DAVENPORT, IOWA, ASSIGNOR TO BETTENDORF METAL WHEEL COMPANY, OF ILLINOIS.

METHOD OF MAKING WHEELS.

SPECIFICATION forming part of Letters Patent No. 682,982, dated September 17, 1901.

Application filed July 11, 1901. Serial No. 67,918. (No model.)

*To all whom it may concern:*

Be it known that I, EMIL EINFELDT, of Davenport, county of Scott, and State of Iowa, have invented a new and useful Improvement in Methods of Making Wheels, of which the following is a specification.

The object of this invention is to produce a metal wheel in which the spokes will be under tension; and the invention comprehends a method of manufacture in which tension is applied to the spokes by forcibly seating and securing a rim against shoulders on the outer ends of the spokes, the rim before being secured against the shoulders being slightly greater in diameter than the distance between the shoulders on diametrically opposite spokes. As a result of this manner of procedure the rim will be drawn inward at a point where it is secured to the spokes, and by reason of its natural tendency to resume its normal condition it will exert an outward longitudinal pull or tension equably and uniformly on all the spokes and place them under tension.

Figure 1:
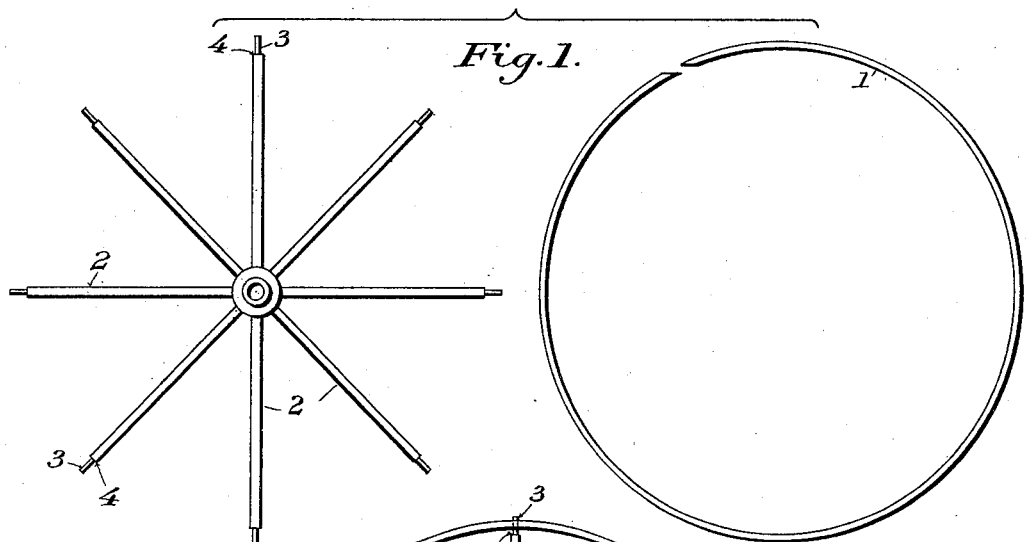
Figure 2:
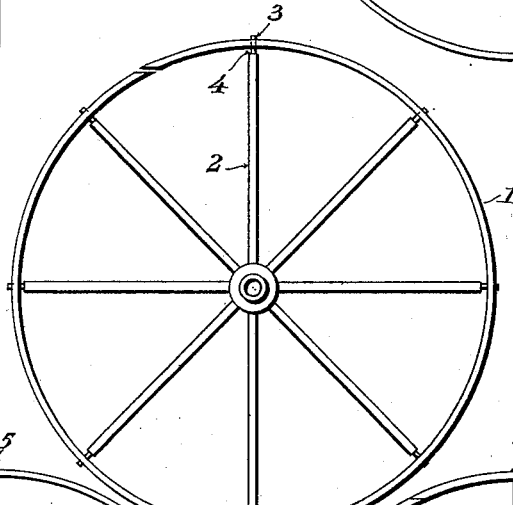
Figure 3:
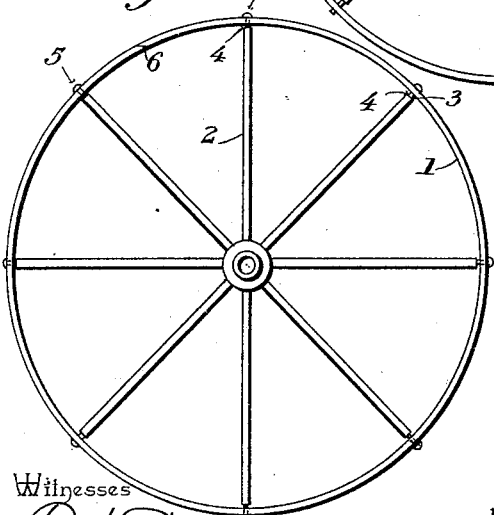
Figure 4:
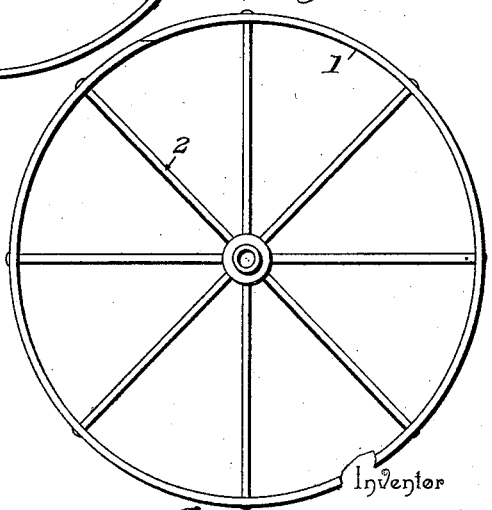

In the accompanying drawings, Figure 1 represents in elevation a hub with the spokes secured in place and a rim with its ends disconnected as they appear before being assembled. Fig. 2 is an elevation showing the disconnected rim slipped over the ends of the spokes. Fig. 3 is a similar view showing the ends of the spokes partially riveted and the ends of the rim connected. Fig. 4 is an elevation of the complete wheel, showing the final riveting of the spokes and the rim seated tightly against the shoulders thereon.

Referring to the drawings, in carrying my invention into effect I bend from a suitable strip of metal a rim 1 and provide the same at intervals with holes to receive the ends of the spokes. I also provide a hub and fix in the same a series of spokes 2, having their outer ends reduced in the form of tenons 3, leaving shoulders 4. This rim with its ends disconnected is now slipped over the ends of the spokes, the tenons of the latter entering the holes in the rim, as shown in Fig. 2. The outer ends or tenons of the spokes are now partially riveted down, as shown at 5, Fig. 3, which will slightly contract the rim and bring its ends closely together, as at 6, the rim being of such a size that when in this condition it will extend a slight distance above and beyond the shoulders on the spokes, being therefore of a greater diameter than the distance between the shoulders on diametrically opposite spokes. The rim now has its ends welded or otherwise firmly connected, and as a final step in the method of procedure the riveting of the spokes is completed, the heads being forced down against the rim and forcing the latter firmly and tightly against the spoke-shoulders, as shown in Fig. 4. As a result the rim will at the points where it is connected with the spokes be drawn inward, causing a slight outward bend of the same in the intervals between the spokes, and the tendency of the rim to resume its normal condition at the points where it is drawn inward will pull endwise on the spokes and exert a uniform outward strain and place them under tension. The amount of bend or deflection of the rim to effect the requisite tension is not sufficient to be appreciable to an extent which will affect the practical use of the same, being so slight as not to noticeably destroy its general circular contour.

It will be noted that in the manner of procedure described the rim after being slipped over the ends of the spokes is primarily forced inward to its temporary relation to the spoke-shoulders by partially riveting the ends of the spokes; but this primary relation of the rim to the spoke-shoulders may be secured by fastening the ends of the rim together after it is passed over the ends of the spokes, after which the ends of the spokes may be riveted down to seat the rim firmly against the spoke-shoulders.

Having thus described my invention, what I claim is—

1. The method of making metal wheels which consists in inserting shouldered ends of spokes through an open-ended rim, securing the ends of the rim together so that it will be of a diameter greater than the distance between the shoulders on diametrically opposite spokes, and finally seating and securing the rim tightly against the shoulders.

2. The method of making metal wheels which consists in providing a hub with shouldered spokes, and an open-ended rim with holes, passing the ends of the spokes through the holes in the rim, forcing the rim inward to within a slight distance of the shoulders on the spokes, securing the ends of the rim together, and finally fastening the rim firmly against the shoulders.

3. The method of making metal wheels which consists in providing a hub with shouldered spokes, and an open-ended rim with holes, passing the ends of the spokes through the holes in the rim, partially riveting the ends of the spokes and thereby forcing the rim to within a short distance of the shoulders on the spokes, securing the ends of the rims together, and finally completing the riveting of the spoke ends to force the rim tightly against the spoke-shoulders.

In testimony whereof I hereunto set my hand, this 17th day of June, 1901, in the presence of two attesting witnesses.

EMIL EINFELDT.

Witnesses:
NATH. FRENCH,
MAY L. DODGE.